United States Patent
Lim

(10) Patent No.: US 7,203,829 B2
(45) Date of Patent: Apr. 10, 2007

(54) APPARATUS AND METHOD FOR INITIALIZING COPROCESSOR FOR USE IN SYSTEM COMPRISED OF MAIN PROCESSOR AND COPROCESSOR

(75) Inventor: Chae-Whan Lim, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 326 days.

(21) Appl. No.: 10/864,459

(22) Filed: Jun. 10, 2004

(65) Prior Publication Data

US 2004/0255111 A1    Dec. 16, 2004

(30) Foreign Application Priority Data

Jun. 13, 2003    (KR) .................. 10-2003-0038386

(51) Int. Cl.
*G06F 9/22*     (2006.01)
*G06F 9/44*     (2006.01)
*G06F 15/177*   (2006.01)

(52) U.S. Cl. ................. 713/2; 713/1; 713/100; 717/168

(58) Field of Classification Search .......... None
See application file for complete search history.

(56) References Cited

U.S. PATENT DOCUMENTS

| | | | |
|---|---|---|---|
| 6,253,233 B1* | 6/2001 | Hayashi ................ | 711/147 |
| 6,330,658 B1* | 12/2001 | Evoy et al. ............ | 712/31 |
| 6,400,717 B1* | 6/2002 | Von Ahnen et al. ..... | 714/36 |
| 6,604,189 B1* | 8/2003 | Zemlyak et al. ........ | 711/148 |
| 2002/0170051 A1* | 11/2002 | Watanabe et al. ....... | 717/168 |

* cited by examiner

*Primary Examiner*—James K. Trujillo
(74) *Attorney, Agent, or Firm*—Roylance, Abrams, Berdo & Goodman, L.L.P.

(57) ABSTRACT

An apparatus and method for initializing a coprocessor for use in system comprised of a main processor and coprocessor. The apparatus can be provided with fewer required memory components, such as a NOR flash memory, by enabling a coprocessor to perform a booting function upon receiving a control signal from the main processor.

20 Claims, 12 Drawing Sheets

APPARATUS AND METHOD FOR INITIALIZING COPROCESSOR FOR USE IN SYSTEM COMPRISED OF MAIN PROCESSOR AND COPROCESSOR

CROSS-REFERENCE TO RELATED APPLICATIONS

This application claims the benefit under 35 U.S.C. § 119(a) of Korean Patent Application No. 2003-38386 entitled "APPARATUS AND METHOD FOR INITIALIZING COPROCESSOR FOR USE IN SYSTEM COMPRISED OF MAIN PROCESSOR AND COPROCESSOR", filed in the Korean Intellectual Property Office on Jun. 13, 2003, the entire contents of which are incorporated herein by reference.

BACKGROUND OF THE INVENTION

1. Field of the Invention

The present invention relates to an apparatus and method for booting a controller. More particularly, the present invention relates to an apparatus and method for booting a coprocessor for use in a system comprised of a main processor and a coprocessor.

2. Description of the Related Art

Typically, in a system comprised of a main processor and a coprocessor, the main processor controls overall operations of the system, and the coprocessor controls a specific function upon receiving a control signal from the main processor. The aforementioned system has been widely used in mobile terminals having current hybrid functions. For example, in the case of a mobile terminal provided for processing current video signals, a main processor controls overall operations of a communication or mobile terminal, and a coprocessor performs the processing of video signals upon receiving a control signal from the main processor. The aforementioned mobile terminal can be provided with any number of devices, such as a mobile terminal for a camcorder, a PDA (Personal Digital Assistant), a VOD (Video On Demand) phone, and similar devices.

A representative example of the aforementioned system, including the main processor and the coprocessor, is shown in FIG. 1. The following detailed description will hereinafter be described with reference to FIG. 1 in which, the example of the aforementioned system is provided as a mobile terminal.

Referring to FIG. 1, the main processor 100 controls communication and overall operations of the mobile terminal. A first flash memory 110 is comprised of a NOR flash memory for storing boot and loader programs and main operation programs of the main processor 100. A second flash memory 120 is comprised of a NAND flash memory for storing large amounts of nonvolatile data, for example, content data, font data, bitmap data, phonebook data, and similar data.

The second flash memory 120 has a limited number of correction times associated with the same area, such that encounters with an unexpected error in a specified area results in an outcome wherein data cannot be recorded or stored any further in the second flash memory 120. Therefore, a flash file system is adapted to access data of the flash memory (i.e., 110 and 120). RAM (Random Access Memory) 130 can be adapted to function as a work memory for use in the main processor 100. Other peripheral devices 140 are comprised of devices operated by a control signal generated from the main processor 100. In this case, the peripheral devices 140 can be keypads, displays, RF (Radio Frequency) units, communication units, and similar devices.

Upon receiving a control signal from the main processor 100, the coprocessor 200 assumes direction of a specific function, and processes the specific function. An additional first flash memory 210 is comprised of a NOR flash memory for storing boot and loader programs and main operation programs of the coprocessor 200. An additional second flash memory 220 is comprised of a NAND flash memory for storing large amounts of nonvolatile data, for example, content data associated with functions of the coprocessor 200. RAM 230 can be adapted as a work memory of the coprocessor 200. Other peripheral devices 240 are comprised of devices operated by a control signal generated from the coprocessor 200. In this case, if the mobile terminal is a camcorder, the peripheral devices 240 can be devices such as multimedia codecs, cameras, displays (e.g., LCDs), and similar devices. Content data stored in the second flash memory 220 can then include video-processed and similar data. If the mobile terminal is a PDA terminal, substantially all the applications, other than a communication function, can be provided by the peripheral devices 240.

The first flash memories 110 and 210 each can be provided as a NOR flash memory. The second flash memories 120 and 220 can be provided as a NAND flash memory.

As stated above, the main processor 100 and the coprocessor 200 each include a memory unit comprised of NOR and NAND flash memories and RAMs. Therefore, the main processor 100 and the coprocessor 200 must each include the aforementioned memories, resulting in increased hardware installation space and increased production cost. Therefore, it is preferable for either one of the NOR and NAND flash memories to be removed.

The NOR flash memory is very expensive, and where it is configured in the form of a stable configuration, it can store boot and loader programs and flash file systems. The NAND flash memory has advantages in that it is relatively cheaper than the NOR flash memory, and has excellent capacity which is higher than that of the NOR flash memory. However, the NAND flash memory has a relatively-high probability of creating bad sectors in the memory, in which the memory stores content data for use in a corresponding device. Therefore, when storing the boot and loader programs and flash filter systems in the NAND flash memory, it is impossible to perform operations of an overall system if unexpected bad sectors occur in a specific area for storing the programs.

Accordingly, a need exists for an improved system for stably accessing the boot and loader programs and the flash file systems in devices wherein the costly NOR flash memory is removed.

SUMMARY OF THE INVENTION

Therefore, the embodiments of the present invention have been made in view of the above problems, and it is an object of the present invention to provide an apparatus and method for removing a relatively high-priced NOR flash memory from a coprocessor, in a system comprised of a main processor and the coprocessor, and enabling the coprocessor to perform a booting function upon receiving a control signal from the main processor.

It is another object of the present invention to provide an apparatus and method for enabling a coprocessor having no NOR flash memory to perform a booting function using boot/loader programs stored in an internal ROM and a tiny flash file system, in a system comprised of a main processor and the coprocessor including a ROM and a RAM.

It is yet another object of the present invention to provide an apparatus and method for enabling a coprocessor having no NOR flash memory to perform a booting function using boot/loader programs stored in an internal ROM and a tiny flash file system stored in a NOR or NAND flash memory of a main processor, in a system comprised of the main processor and the coprocessor including a ROM and a RAM.

It is yet another object of the present invention to provide an apparatus and method for enabling a coprocessor having no NOR flash memory to perform a booting function using boot/loader programs stored in an internal ROM and a tiny flash file system in a system comprised of a main processor and the coprocessor including only ROM.

It is yet another object of the present invention to provide an apparatus and method for enabling a coprocessor having no NOR flash memory to perform a booting function using boot/loader programs stored in an internal ROM and a tiny flash file system stored in a NOR or NAND flash memory of a main processor, in a system comprised of the main processor and the coprocessor including only ROM.

It is yet another object of the present invention to provide an apparatus and method for enabling a coprocessor having no NOR flash memory to perform a booting function using boot/loader programs and a tiny flash file system that are all stored in a NOR or NAND flash memory of a main processor, in a system comprised of the main processor and the coprocessor and having no internal ROM.

It is yet another object of the present invention to provide an apparatus and method for enabling a coprocessor having no NOR flash memory to perform a booting function using boot/loader programs and a tiny flash file system, that are all stored in a NOR or NAND flash memory of a main processor, in a system comprised of the main processor and the coprocessor and having no internal ROM and RAM.

In accordance with the embodiments of the present invention, the above and other objects can be accomplished by providing an apparatus including a main device and an auxiliary device, comprising in part, the following components.

The main device can include a main processor, including a ROM (Read Only Memory) and a RAM (Random Access Memory), for controlling overall operations of the main device, a first flash memory for storing principal programs of the main device, a second flash memory for storing content data of the main device, and a RAM acting as a work memory of the main device.

The auxiliary device can include a second flash memory for storing principal programs and content data of the auxiliary device, an external RAM acting as a work memory of the auxiliary device, and a coprocessor for including a ROM and a RAM which store boot, loader, and tiny flash file system code files. The coprocessor is further provided for booting the auxiliary device using a boot program stored in the internal ROM when it is initially powered on by the main processor. The coprocessor is still further provided for controlling a loader program to load principal programs stored in the second flash memory by operating the tiny flash file system, and for controlling the operations of the auxiliary device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EXEMPLARY EMBODIMENTS

Figure 1:
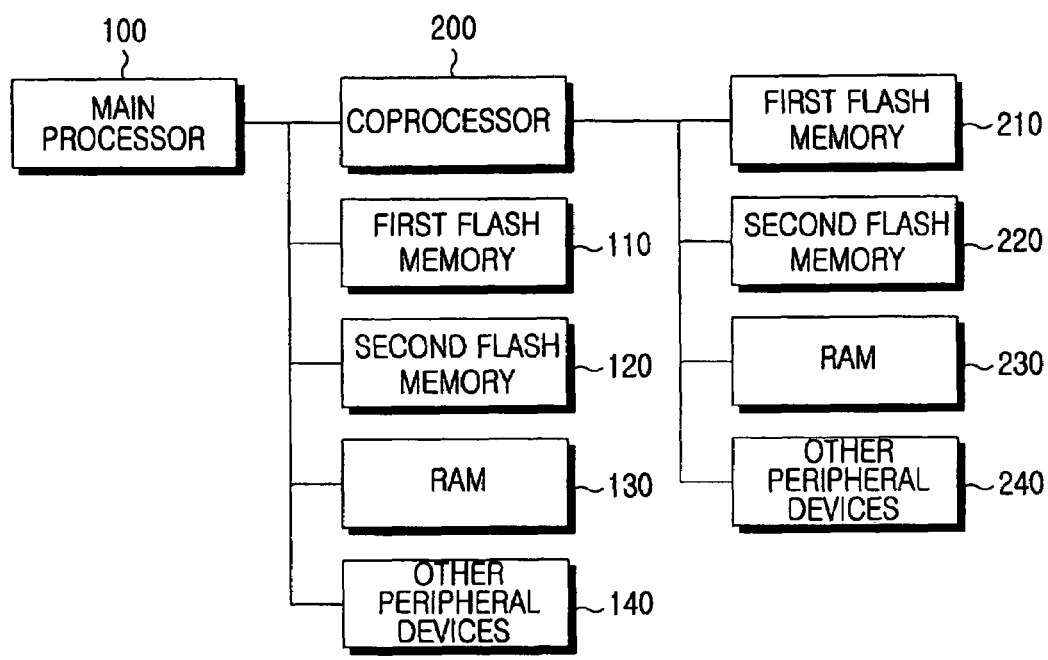
FIG. 1 is a block diagram illustrating a conventional system comprised of a main processor and a coprocessor.

The embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Prior to describing the present invention, it should be noted that the following terms will hereinafter be used in the detailed description of the embodiments of the present invention.

The coprocessor is comprised of a processor for operating application programs or specific functions requiring a high speed, for example, a GUI (Graphic User Interface), a multimedia codec, and similar devices.

The main processor is comprised of a processor for controlling overall operations of a system. For example, in the case of a mobile terminal, an MSM chip may be adapted as the main processor.

The boot module is comprised of a software module for initializing operations of a controller to enter a main software routine.

The loader module is comprised of a software module for initializing a number of necessary modules after performing a booting function, and moving the remaining main software code parts to a specific memory area capable of operating a controller.

The boot-loader module is comprised of a software module wherein the boot module and the loader module are integrated in one module.

The flash file system is comprised of a software module for writing data on a NAND flash memory or reading data from the NAND flash memory without generating errors.

The tiny flash file system is comprised of a minimum software module for reading data from the NAND flash memory without generating errors.

It should be noted that the aforementioned flash file system and the tiny flash file system can be separately adapted to the present invention. Specifically, the tiny flash file system is comprised of a flash file system having a minimum data read function that is capable of guaranteeing integrity of data stored in the NAND flash memory. The flash file system is comprised of a file system for overcoming a variety of problems, for example, a problem of generating bad sectors of the NAND flash memory, and an aging problem generated when a specific position is repeatedly used such that further corrections (i.e., higher than a predetermined number of correction times) are made unavailable. In doing so, the flash file system can be used for stably writing or reading data on/from a memory. The tiny flash file system can be used where a memory is an equivalent to a NAND flash memory. A detailed description of the NOR flash memory is described in greater detail below.

The first flash memory is comprised of a NOR flash memory.

The second flash memory is comprised of a NAND flash memory.

The embodiments of the present invention remove a flash memory for storing initialization information of a coprocessor from a system, the system including a main processor and the coprocessor, and stores initialization information of the coprocessor in either another memory of the coprocessor, or a memory of the main processor, such that the system initialization is established. The memory can be either one of a ROM, a RAM, first and second flash memories, and similar devices. The initialization information can be either one of a boot program module, a loader program, a boot loader program, and a tiny flash file system of the coprocessor.

In the implementation of the aforementioned configurations, a main device for use in the embodiments of the present invention can include a main processor for operating overall operations of the main device, a first flash memory for storing the principal programs of the main processor, and a second flash memory for storing content data of the main processor. An auxiliary device for use in the embodiments of the present invention can include a coprocessor for controlling overall operations of the auxiliary device, and a second flash memory for storing the principal programs and content data of the auxiliary device. Initialization information of the auxiliary device, for example, a boot program, a loader program, a boot-loader program, and tiny flash file systems, can be stored in an internal ROM of the coprocessor, an internal ROM of the main processor, the first flash memory or the second flash memory. A detailed description of the aforementioned initialization information is described in greater detail below with reference to the following preferred embodiments.

The aforementioned initialization information, for example, a boot program, a loader program, a boot-loader program, and a tiny flash file system, can be stored in the coprocessor's ROM, the main processor's ROM and/or the main processor's flash memory. The flash memory of the main processor can be comprised of NOR and NAND flash memories. The boot program, the loader program, the boot-loader program, and the tiny flash file systems are comprised of programs operated in the coprocessor.

In accordance with the system initialization operations for use in the system, which is comprised of the main device and the auxiliary device, a system booting operation can be performed by a boot program stored in the main processor's memory or the coprocessor's internal ROM, and the principal programs stored in the second flash memory of the coprocessor are loaded by the tiny flash file system, such that operations of the auxiliary device can be performed.

Figure 2:
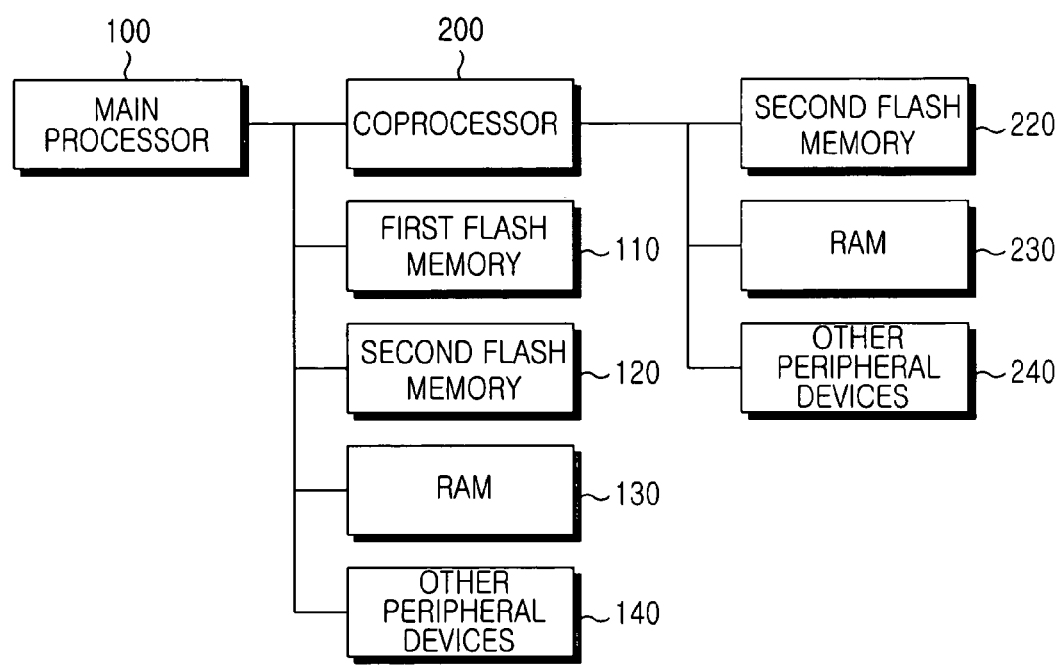
FIG. 2 is a block diagram illustrating a system comprised of a main processor and a coprocessor in accordance with an embodiment of the present invention.

FIG. 2 is a block diagram illustrating a system comprised of a main processor and a coprocessor in accordance with an embodiment of the present invention. Specifically, FIG. 2 is a block diagram of a system for removing a first flash memory from the coprocessor 200.

Referring to FIG. 2, the remaining block diagram configurations, from which the first flash memory is removed from the coprocessor 200, are equal to those of FIG. 1. In this case, the first flash memory 110, the second flash memory 120, external RAM 130, and other peripheral devices 140 are driven by a control signal received from the main processor 100. The first flash memory 110 is comprised of a memory for storing a boot module, a loader module, a flash file system, and other execution program modules of the main processor 100. The second flash memory 120 is comprised of a memory for storing nonvolatile data generated by a control signal of the main processor 100, for example, content data, font data, bit data, phonebook data, and similar data. The main processor 100 performs its initialization operation using individual software modules stored in the first flash memory 110 when it is initially powered on, and provides the coprocessor 200 with a power-supply voltage such that it is able to initialize the coprocessor 200.

In this case, the first flash memory is removed from the coprocessor 200. This first flash memory removed from the coprocessor 200 is comprised of a memory for storing a boot module, a loader module, a flash file system, and other coprocessors' program modules. Therefore, the embodiment of the present invention shown in FIG. 2 distributes the boot module, the loader module, and a tiny flash file system needed to read the data of the NAND flash memory from among the flash file system, and stores the above distributed parts in another memory. Further, upon receiving a control signal from the main processor 100, the embodiment of the present invention initializes the coprocessor 200, and loads/operates the remaining program modules, including a flash file system, using a tiny flash file system.

In accordance with a first exemplary embodiment of the present invention which is capable of removing the first flash memory from the coprocessor 200, the coprocessor 200 can perform its booting operation under the following two cases, i.e., a first case in which the coprocessor 200 includes internal ROM and RAM and the internal ROM includes a boot module, a loader module, and a tiny flash file system, and a second case in which the internal ROM includes only boot and loader modules and a tiny flash file system of the coprocessor 200 is included in either the first flash memory 110 or the second flash memory 120.

In accordance with a second exemplary embodiment of the present invention, the coprocessor 200 can perform its booting operation under the following two cases, i.e., a first case in which the coprocessor 200 includes an internal ROM and the internal ROM includes a boot module, a loader module, and a tiny flash file system, and a second case in which the internal ROM includes only boot and loader modules and a tiny flash file system of the coprocessor 200 is included in either the first flash memory 110 or the second flash memory 120.

In accordance with the first exemplary embodiment of the present invention, a RAM is included in the coprocessor, and a tiny flash file system is stored in the internal RAM of the coprocessor. In accordance with the second exemplary embodiment of the present invention, a RAM is not included in the coprocessor, but is stored in an external RAM of the coprocessor.

In accordance with a third exemplary embodiment of the present invention, the coprocessor 200 can perform its booting operation in the case where it includes only a RAM, and wherein either the first flash memory 110 or the second flash memory 120 of the main processor 100 includes a boot module, a loader module, and a tiny flash file system of the coprocessor 200.

In accordance with a fourth exemplary embodiment of the present invention, the coprocessor 200 can perform its booting operation in the case where it does not include a RAM and a ROM, and wherein either the first flash memory 110 or the second flash memory 120 of the main processor 100 includes a boot module, a loader module, and a tiny flash file system of the coprocessor 200.

Figure 3:
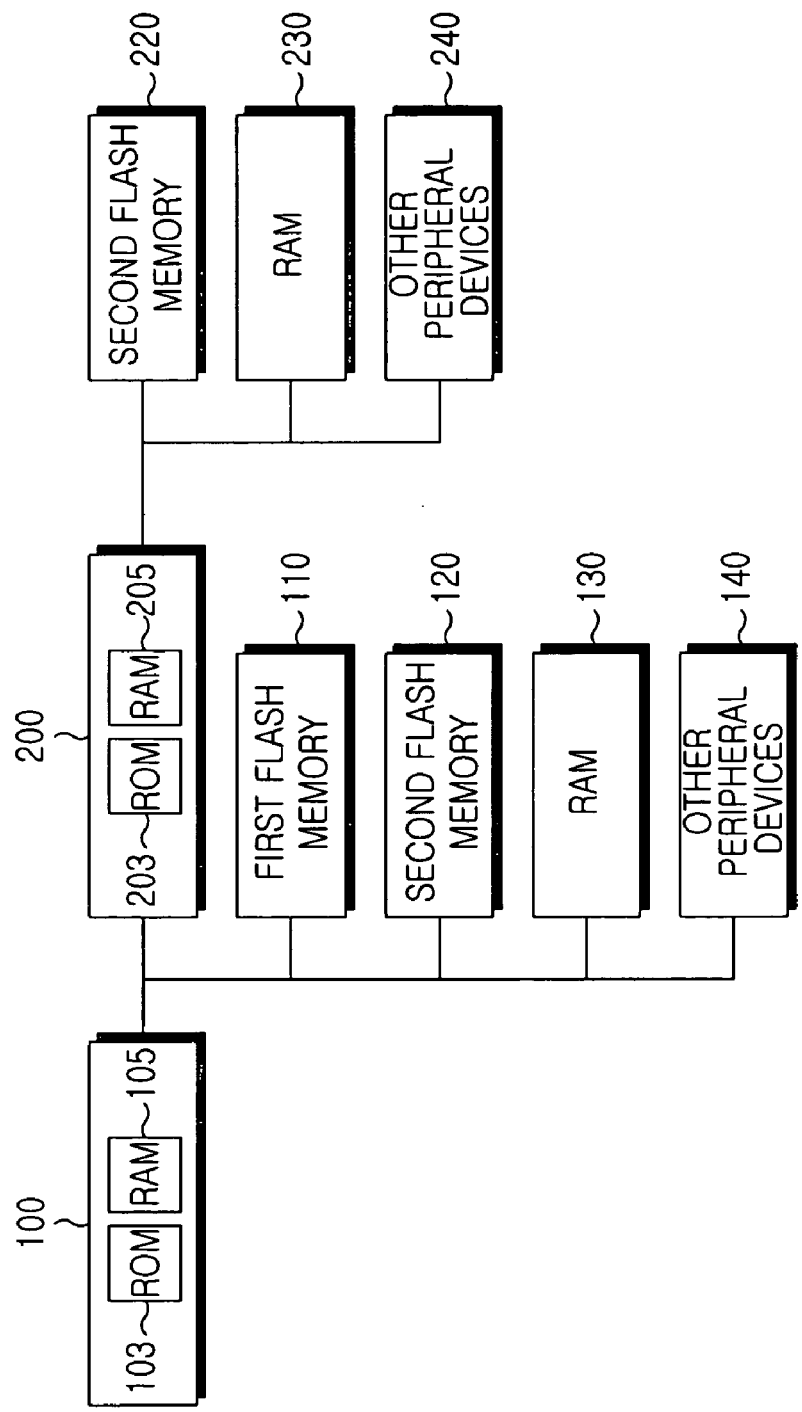
FIG. 3 is a block diagram illustrating a system comprised of a main processor and a coprocessor in accordance with a first exemplary embodiment of the present invention.

FIG. 3 is a block diagram illustrating an overall system associated with the aforementioned case in which the ROM 203 and the RAM 205 are included in the coprocessor 200 in a system comprised of the main processor 100 and the coprocessor 200.

Referring to FIG. 3, the coprocessor 200 includes the ROM 203 and the RAM 205. The internal ROM 203 stores a boot module, a loader module, and a tiny flash file system of the coprocessor 200, as denoted by 'boot+loader+tiny flash file system'. Also, the boot module and the loader module are stored in the internal ROM 203, as denoted by 'boot+loader'. The tiny flash file system of the coprocessor 200 is stored in either the first flash memory 110 or the second flash memory 120 of the main processor 100.

Figure 4:
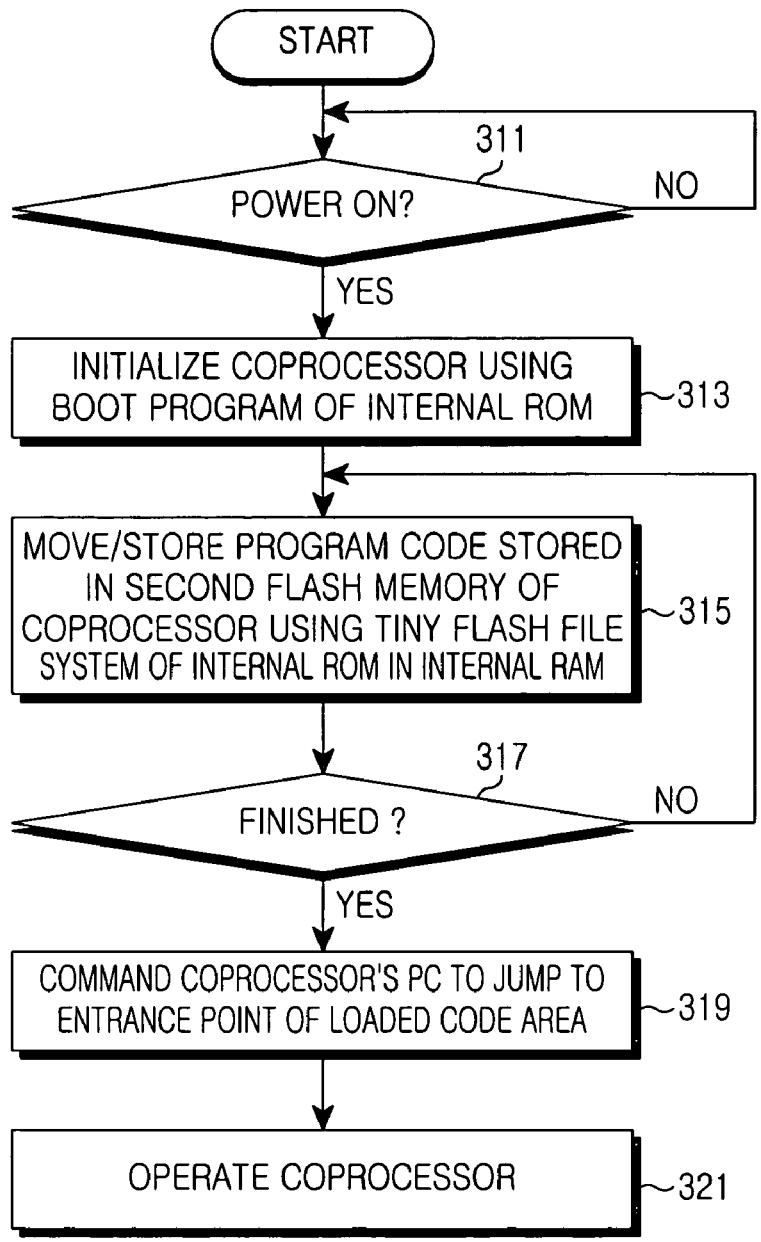
FIG. 4 is a flow chart illustrating a booting procedure for use in a coprocessor when an internal ROM of the coprocessor of FIG. 3 includes a boot program and a tiny flash file system in accordance with the first embodiment of the present invention.
Figure 5:
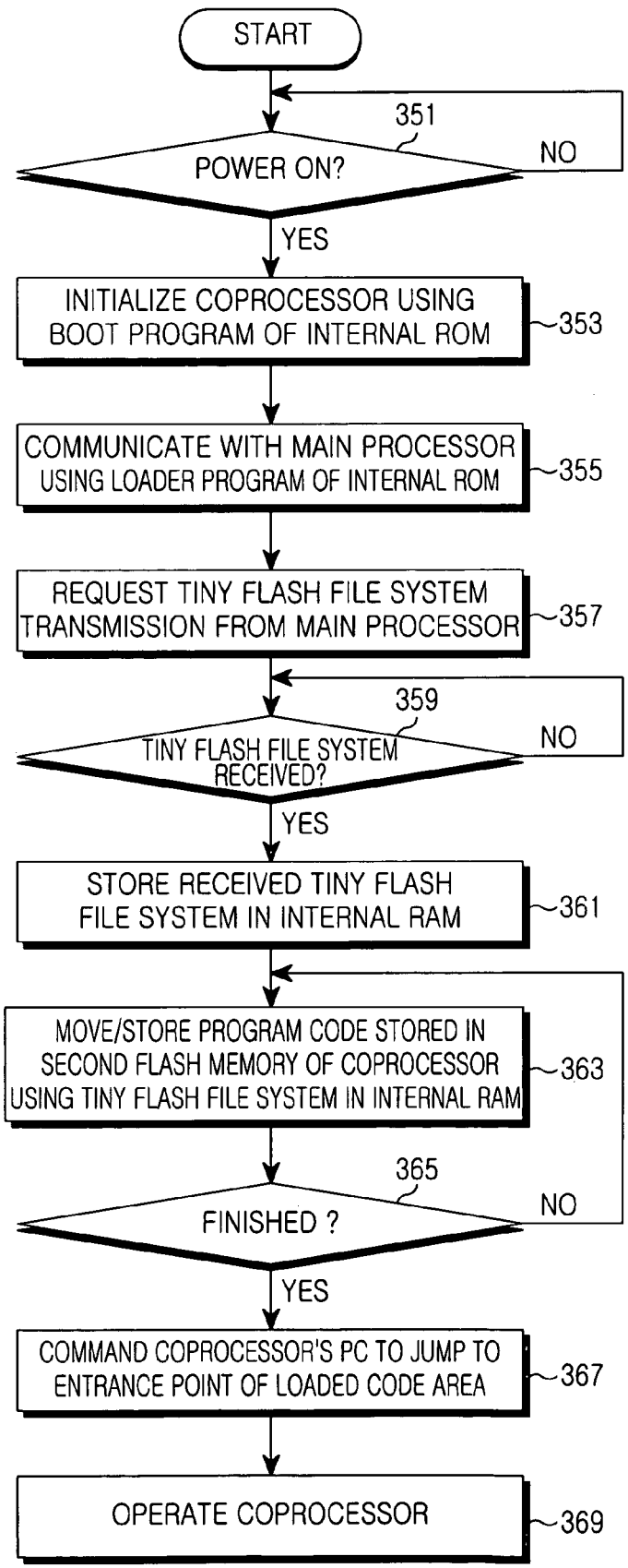
FIG. 5 is a flow chart illustrating a booting procedure for use in a coprocessor when an internal ROM of the coprocessor includes boot and loader programs and the other internal ROM of the main processor includes a tiny flash file system in accordance with the first embodiment of the present invention.

FIG. 4 is a flow chart illustrating an initialization procedure of the coprocessor 200 in the case where the ROM 203 and the RAM 205 are included in the coprocessor 200, and the internal ROM 203 stores a boot module, a loader module, and a tiny flash file system of the coprocessor 200. FIG. 5 is a flow chart illustrating an initialization procedure of the coprocessor 200 in the case where the ROM 203 and the RAM 205 are included in the coprocessor 200, the internal ROM 203 stores the boot and loader modules, and the tiny flash file system of the coprocessor 200 is stored in either the first flash memory 110 or the second flash memory 120.

Referring to FIG. 4, if the coprocessor 200 is powered on when the main processor 100 is initialized, it detects the powered-on state at step 311, and gains access to the boot module stored in the internal ROM 203 such that the coprocessor 200 is initialized at step 313. A loader module of the coprocessor 200, which is provided for storing the loader module in the second flash memory 220, reads a program code of the coprocessor 200 using a tiny flash file system of the internal ROM 203, and the read program data is stored in the internal RAM 205 at step 315.

The aforementioned operations are repeated until a code that is capable of performing basic operations is stored in the internal RAM 205. After completing the aforementioned operations, the coprocessor 200 detects this operation completion state at step 317, and a program counter (PC) of the coprocessor 200 jumps to an entrance point of a loaded code area at step 319. The coprocessor 200 then performs main operations at step 321.

Referring to FIG. 5, if the coprocessor 200 is powered on when the main processor 100 is initialized, the coprocessor 200 detects the powered-on state at step 351, and gains access to the boot module stored in the internal ROM 203 such that the coprocessor 200 is initialized at step 353. The internal ROM 205 accesses the loader module, and starts communication with the main processor 100 according to a prescribed communication specification at step 355. When starting communication with the main processor 100, the loader module of the coprocessor 200 requests a transmission message of the tiny flash file system from the main processor 100 at step 357.

The main processor 100, having received the transmission message of the tiny flash file system, then reads code data of the tiny flash file system of the coprocessor 200 from either the first flash memory 110 or the second flash memory 120 by means of the flash file system of the main processor 100. The main processor 100 then transmits the read code data to the loader module of the coprocessor 200 according to a prescribed communication specification.

The coprocessor 200 detects the reception of the tiny flash file system transferred from the main processor 100 at step 359, and stores the received tiny flash file system code data in the internal RAM 205 at step 361. The loader module of the coprocessor 200, which is provided for storing the loader module in the second flash memory 220, reads a program code of the coprocessor 200 using the tiny flash file system stored in the internal RAM 205. The read program data is then stored in the internal RAM 205 at step 363.

The aforementioned operations are repeated until all of the code for performing basic operations and principal programs is moved to and stored in the internal RAM 205. After completing the aforementioned operations, the coprocessor 200 detects this operation completion state at step 365, and a program counter (PC) of the coprocessor 200 jumps to an entrance point of a loaded code area at step 367. The coprocessor 200 then performs main operations at step 369.

Figure 6:
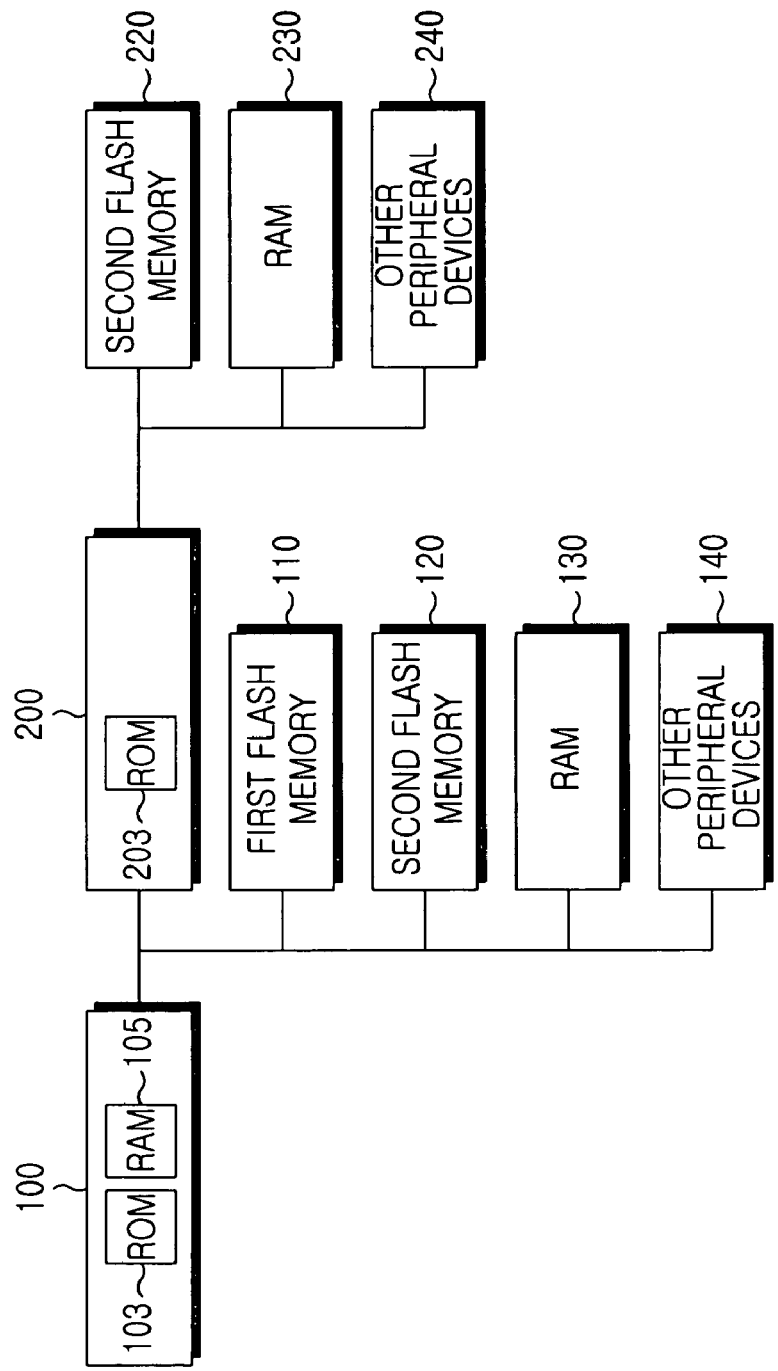
FIG. 6 is a block diagram illustrating a system comprised of a main processor and a coprocessor in accordance with a second exemplary embodiment of the present invention.

FIG. 6 is a block diagram illustrating an overall system comprised of the main processor 100 and the coprocessor 200 and associated with a specific case in which the ROM 203 is included in the coprocessor 200 and the RAM is not included in the coprocessor 200.

Referring to FIG. 6, the coprocessor 200 includes only the ROM 203, wherein the ROM 203 can also be referred to as an internal ROM. The internal ROM 203 stores a boot module, a loader module, and a tiny flash file system of the coprocessor 200, as denoted by 'boot+loader+tiny flash file system'. Also, the boot module and the loader module are stored in the internal ROM 203, as denoted by 'boot+ loader'. The tiny flash file system of the coprocessor 200 is stored in either the first flash memory 110 or the second flash memory 120 of the main processor 100.

Figure 7:
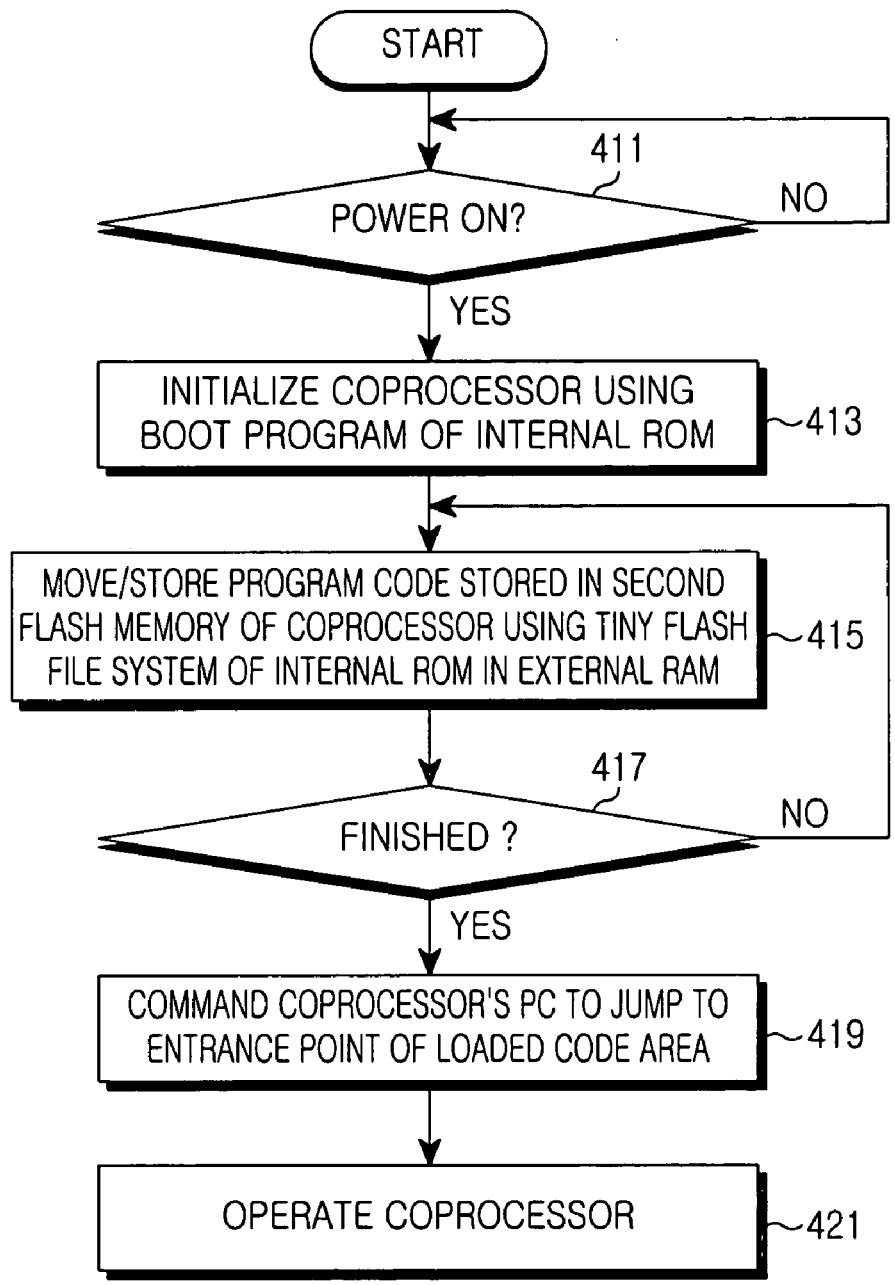
FIG. 7 is a flow chart illustrating a booting procedure for use in a coprocessor when an internal ROM of the coprocessor of FIG. 6 includes a boot program and a tiny flash file system in accordance with the second embodiment of the present invention.
Figure 8:
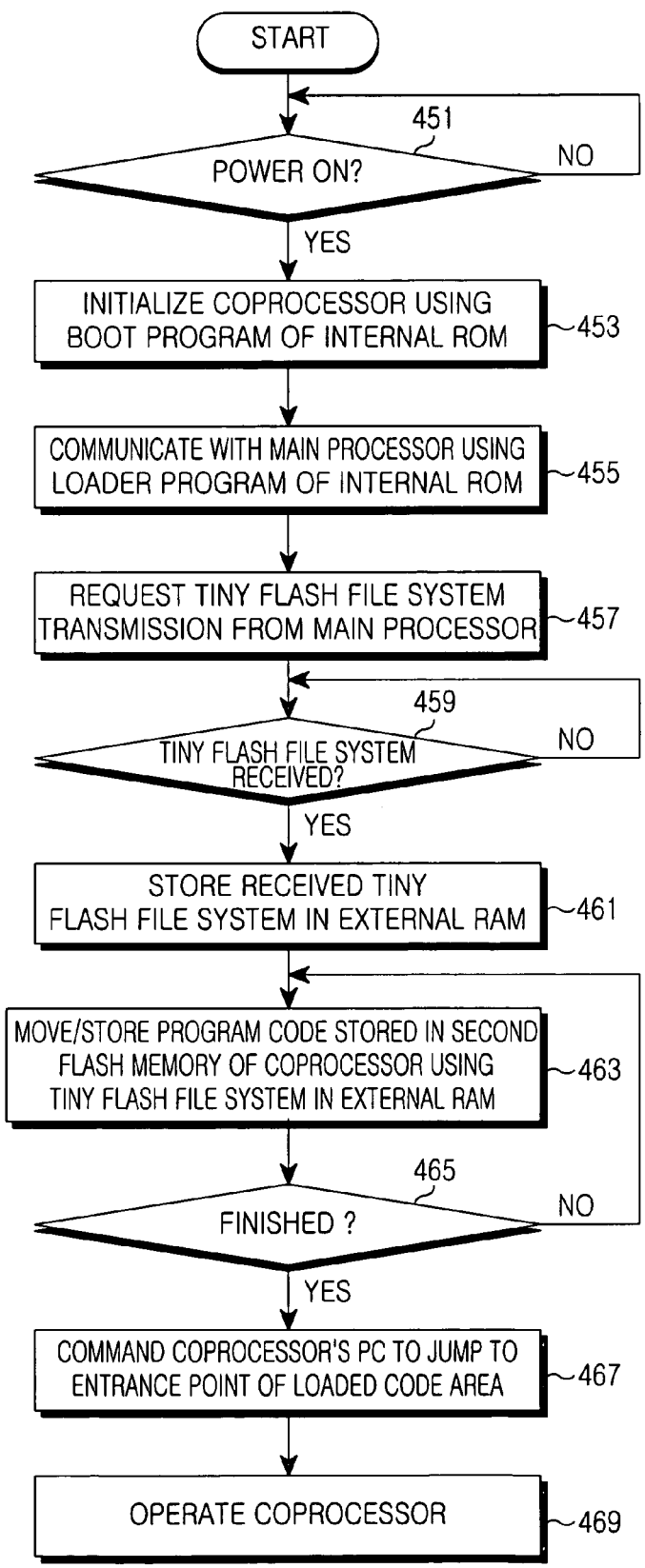
FIG. 8 is a flow chart illustrating a booting procedure for use in a coprocessor when an internal ROM of the coprocessor includes boot and loader programs and the other internal ROM of the main processor includes a tiny flash file system in accordance with the second embodiment of the present invention.

FIG. 7 is a flow chart illustrating an initialization procedure of the coprocessor 200 in the case where only the ROM 203 is included in the coprocessor 200 and the internal ROM 203 stores a boot module, a loader module, and a tiny flash file system of the coprocessor 200. FIG. 8 is a flow chart illustrating an initialization procedure of the coprocessor 200 in the case where only the ROM 203 is included in the coprocessor 200, the internal ROM 203 stores boot and loader modules, and the tiny flash file system of the coprocessor 200 is stored in either the first flash memory 110 or the second flash memory 120.

Referring to FIG. 7, if the coprocessor 200 is powered on when the main processor 100 is initialized, it detects the powered-on state at step 411, and gains access to the boot module stored in the internal ROM 203 such that the coprocessor 200 is initialized at step 413. A loader module of the coprocessor 200, which is provided for storing the loader module in the second flash memory 220, reads a program code of the coprocessor 200 using a tiny flash file system of the internal ROM 203, and the read program data is stored in the external RAM 230 at step 415. The aforementioned operations are repeated until a code that is capable of performing basic operations is stored in the external RAM 230. After completing the aforementioned operations, the coprocessor 200 detects this operation completion state at step 417, and a program counter (PC) of the coprocessor 200 jumps to an entrance point of a loaded code area at step 419. The coprocessor 200 then performs main operations at step 421.

Referring to FIG. 8, if the coprocessor 200 is powered on when the main processor 100 is initialized, the coprocessor 200 detects the powered-on state at step 451, and gains access to the boot module stored in the internal ROM 203 such that the coprocessor 200 is initialized at step 453. The internal ROM 203 accesses the loader module, and starts communication with the main processor 100 according to a prescribed communication specification at step 455. When starting communication with the main processor 100, the loader module of the coprocessor 200 requests a transmission message of the tiny flash file system from the main processor 100 at step 457.

The main processor 100, having received the transmission message of the tiny flash file system, then reads code data of the tiny flash file system of the coprocessor 200 from either the first flash memory 110 or the second flash memory 120 by means of the flash file system of the main processor 100. The main processor 100 then transmits the read code data to the loader module of the coprocessor 200 according to a prescribed communication specification.

The loader program of the coprocessor 200 detects the reception of the tiny flash file system which is transferred from the main processor 100 at step 459, and stores the received tiny flash file system code data in the external RAM 230 at step 461. The loader module of the coprocessor 200, which is provided for storing the loader module in the second flash memory 220, reads a program code of the coprocessor 200 using the tiny flash file system stored in the external RAM 230, and the read program data is stored in the internal RAM 205 at step 463.

The aforementioned operations are repeated until all of the code for performing basic operations and principal programs are moved to and stored in the external RAM 230. After completing the aforementioned operations, the coprocessor 200 detects this operation completion state at step 465, and a program counter (PC) of the coprocessor 200 jumps to an entrance point of a loaded code area at step 467. The coprocessor 200 then performs main operations at step 469.

Figure 9:
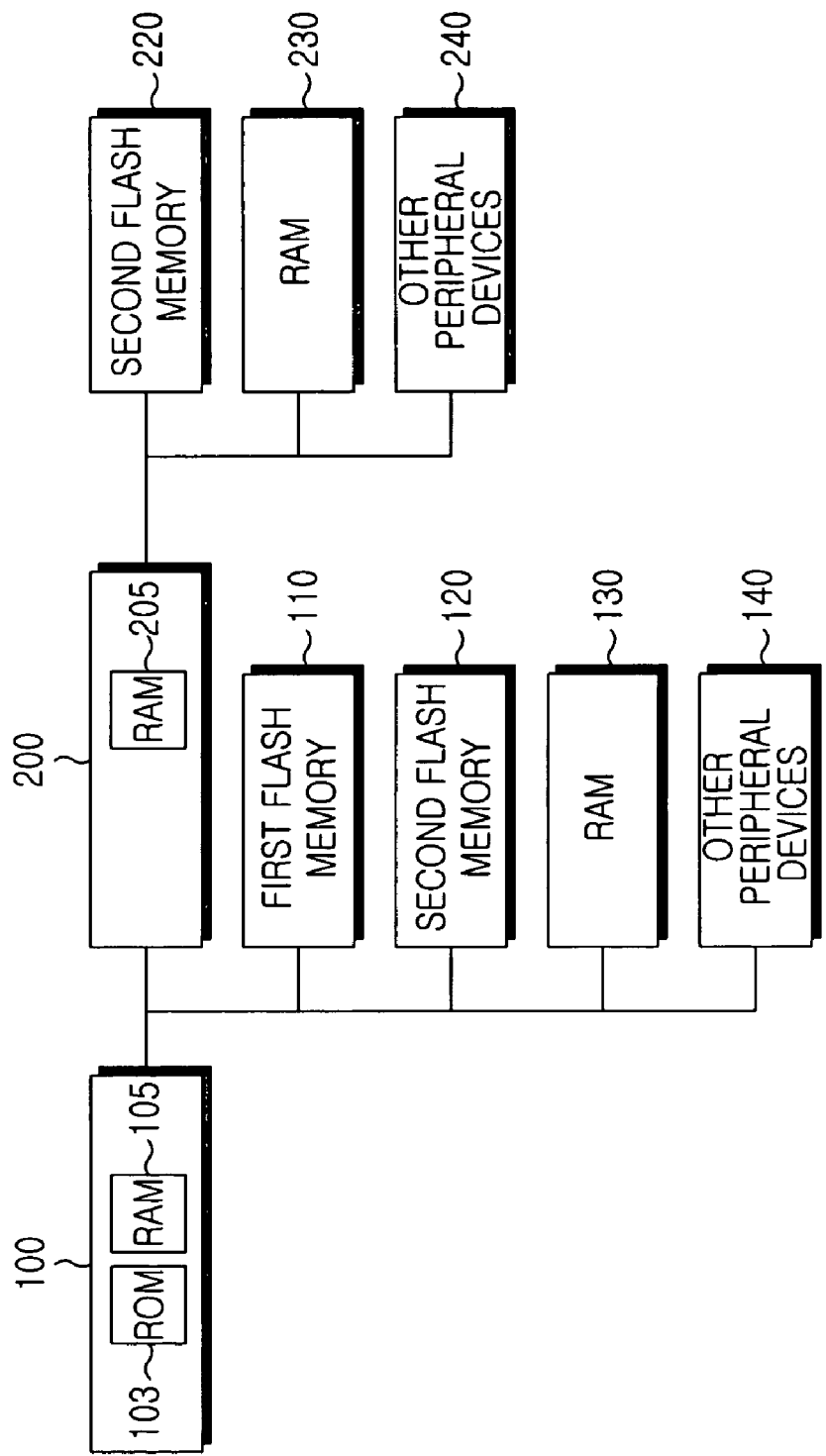
FIG. 9 is a block diagram illustrating a system comprised of a main processor and a coprocessor in accordance with a third exemplary embodiment of the present invention.

FIG. 9 is a block diagram illustrating an overall system comprised of the main processor 100 and the coprocessor 200, which is associated with a specific case in which the internal ROM is not included in the coprocessor 200, and wherein only the RAM 205 is included in the coprocessor 200 in the system.

Referring to FIG. 9, the coprocessor 200 includes only the RAM 205, and does not include the ROM. In this embodiment, either the first flash memory 110 or the second flash memory 120 of the main processor 100 stores a boot module, a loader module, and a tiny flash file system of the coprocessor 200, as denoted by 'boot+loader+tiny flash file system'. Therefore, the coprocessor 200 receives boot and loader modules, and a tiny flash file system from either the first flash memory 110 or the second flash memory 120 of the main processor 100. The coprocessor 200 then moves the received data to the internal RAM 205 for storage in the internal RAM 205. Therefore, the coprocessor 200 is booted using the boot and loader modules, and the tiny flash file system stored in the internal RAM 205. The coprocessor 200 can then load the principal program codes stored in the second flash memory 220 using the same.

Figure 10:
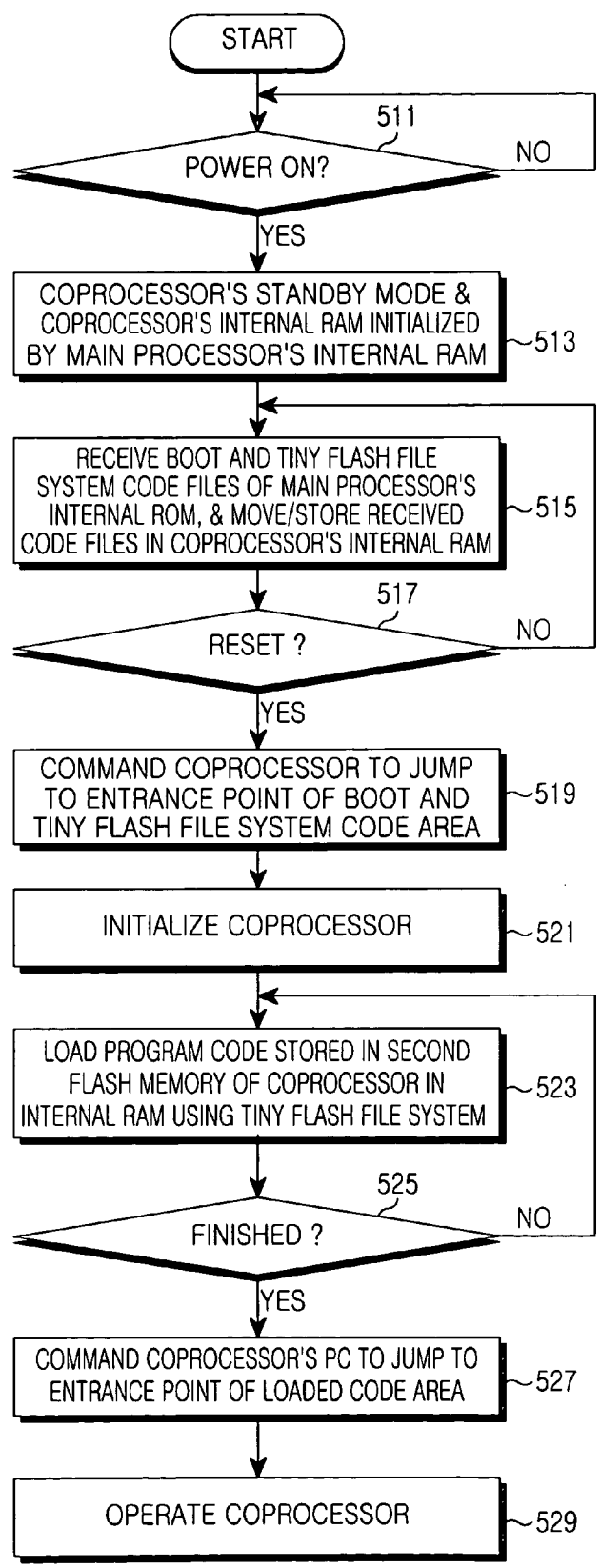
FIG. 10 is a flow chart illustrating a booting procedure for use in a coprocessor when an internal ROM of the main processor of FIG. 9 includes a boot program and a tiny flash file system in accordance with the third embodiment of the present invention.

FIG. 10 is a flow chart illustrating an initialization procedure for use in the coprocessor 200 in the system of FIG. 9.

Referring to FIG. 10, if the coprocessor 200 is powered on when the main processor 100 is initialized, the coprocessor 200 detects this powered-on state at step 511, and is initialized to control the internal RAM 205 to be accessed by the main processor 100, while simultaneously remaining in a lock state at step 513. The main processor 100 reads code files of the boot module, the loader module, and the tiny flash file system from either the first flash memory 110 or the second flash memory 120, and moves the read code files to the internal RAM 205 of the coprocessor 200 for storage in the RAM 205. Therefore, the internal RAM 205 of the coprocessor 200 stores the boot, loader, and tiny flash file system code files transferred from the main processor 100 at step 513. By repeating the aforementioned operations, the boot, loader, and tiny flash file system code files of the coprocessor 200 are stored in the internal RAM 205.

After completing the transmission of the boot, loader, and tiny flash file system code files of the coprocessor 200 to either the first flash memory 110 or the second flash memory 120, the main processor 100 then resets the coprocessor 200. In this case, the main processor 100 can reset the coprocessor using a variety of methods, including for example, a method for recording a specific value in a specific register contained in the coprocessor 200, and a method for applying a signal to a reset terminal exposed to the outside of the coprocessor 200.

Upon receiving the reset signal at step 517, the coprocessor 200 is reset. In this case, the internal RAM 205 of the coprocessor 200 stores the boot module, the loader module, and the tiny flash file system code file of the coprocessor 200. Therefore, the coprocessor 200 is reset, and its PC (Program Counter) jumps to the entrance points of the boot, loader, and tiny flash file system code areas at step 519, such that the coprocessor 200 can perform its booting function at step 521. The coprocessor 200 then enters a specific state in which the loader can drive a loading process using the tiny flash file system. The coprocessor 200 then loads a main program stored in the second flash memory 220 using the tiny flash file system stored in the internal RAM 205 at step 523, and repeats the operation for loading the principal programs stored in the second flash memory 220. After finishing loading of the principal programs, the coprocessor 200 detects the loading completion state at step 525, automatically moves the program counter (PC) to a main program at step 527, and then performs operations of the principal programs at step 529.

Figure 11:
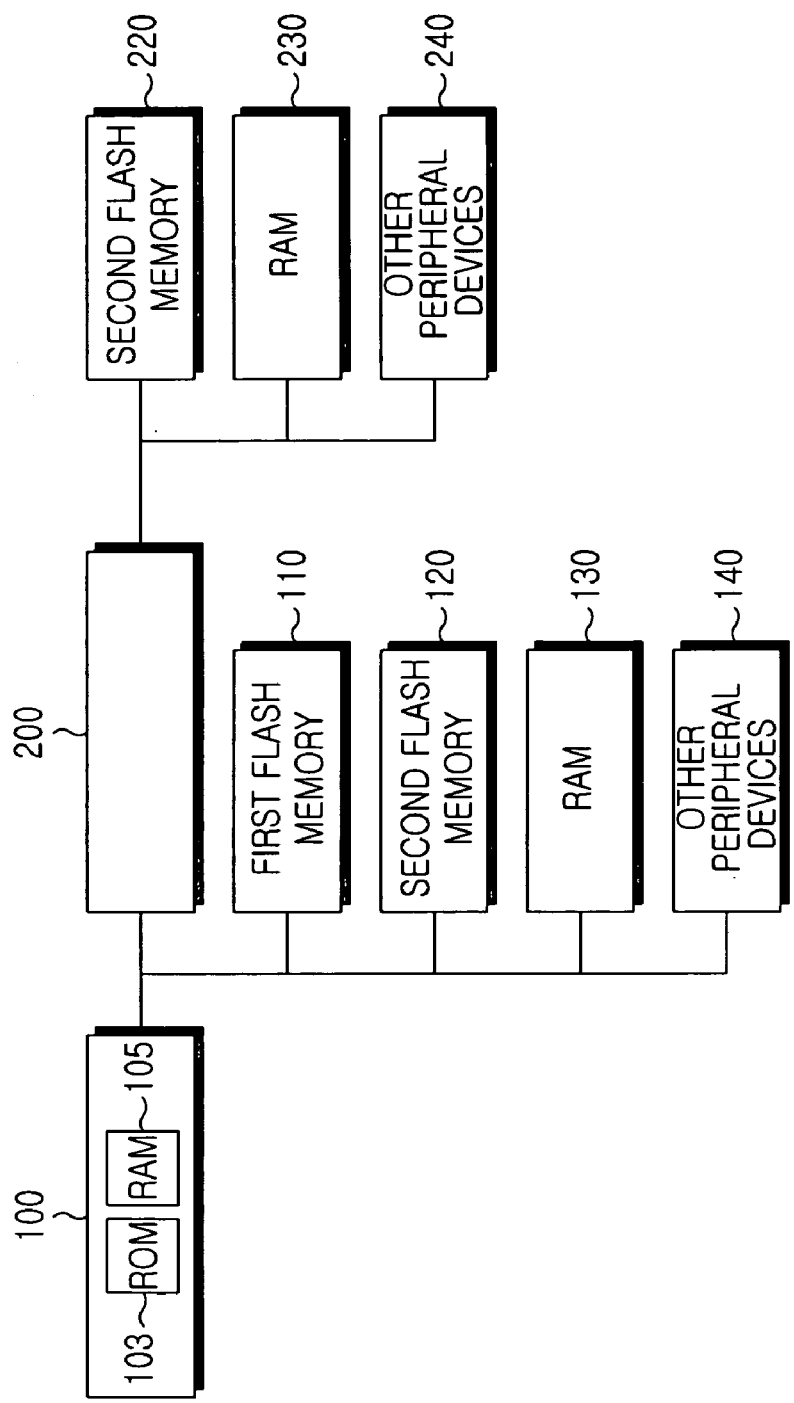
FIG. 11 is a block diagram illustrating a system comprised of a main processor and a coprocessor in accordance with a fourth exemplary embodiment of the present invention.

FIG. 11 is a block diagram illustrating an overall system associated with a specific case in which the coprocessor includes only the external RAM 230, excluding the internal ROM and RAM, and wherein either the first flash memory 110 or the second flash memory 120 stores the boot, loader, and tiny flash file system, as denoted by 'boot+loader+tiny flash file system'.

Referring to FIG. 11, the coprocessor 200 includes only the external RAM 230, and does not include the internal ROM and RAM. In this embodiment, either the first flash memory 110 or the second flash memory 120 of the main processor 100 stores a boot module, a loader module, and a tiny flash file system of the coprocessor 200, as denoted by 'boot+loader+tiny flash file system'. The coprocessor 200 moves the boot, loader, and tiny flash file system stored in the main processor 100 to the external RAM 230 for storage in the external RAM 230. Thereafter, the coprocessor 200 is booted using the boot, loader, and tiny flash file system stored in the external RAM 230, and can load the principal program codes stored in the second flash memory 220 using the same.

Figure 12:
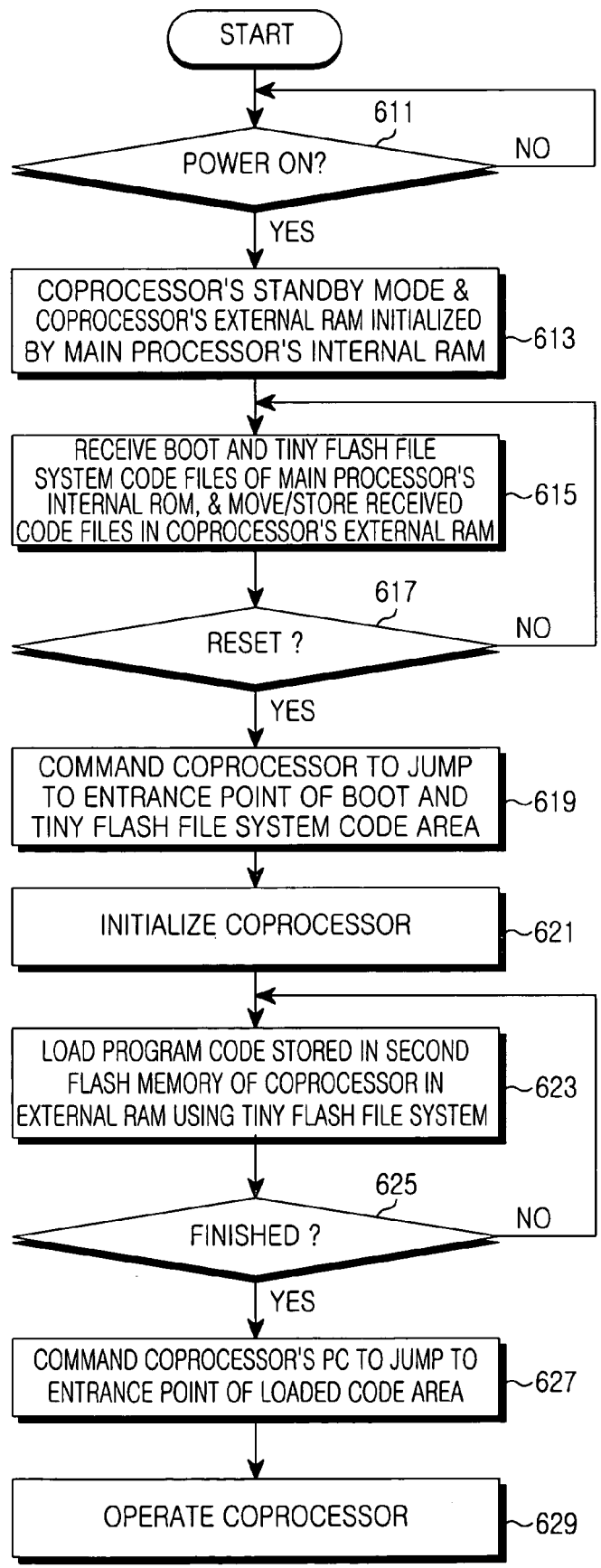
FIG. 12 is a flow chart illustrating a booting procedure for use in a coprocessor when an internal ROM of the main processor of FIG. 11 includes a boot program and a tiny flash file system in accordance with the third embodiment of the present invention.

FIG. 12 is a flow chart illustrating an initialization procedure for use in the coprocessor 200 in the system of FIG. 10.

Referring to FIG. 12, if the coprocessor 200 is powered on when the main processor 100 is initialized, it detects this powered-on state at step 611 and is initialized to control the external RAM 230 to be accessed by the main processor 100 while simultaneously remaining in a lock state at step 613. The main processor 100 reads code files of the boot module, the loader module, and the tiny flash file system from either the first flash memory 110 or the second flash memory 120, and moves the read code files to the external RAM 230 of the coprocessor 200 for storage in the external RAM 230. Therefore, the external RAM 230 of the coprocessor 200 stores the boot, loader, and tiny flash file system code files transferred from the main processor 100 at step 613. By repeating the aforementioned operations, the boot, loader, and tiny flash file system code files of the coprocessor 200 are stored in the external RAM 230.

After finishing the transmission of the boot, loader, and tiny flash file system code files of the coprocessor 200 to either the first flash memory 110 or the second flash memory 120, the main processor 100 resets the coprocessor 200. In this case, the main processor 100 can reset the coprocessor using a variety of methods, including for example, a method for recording a specific value in a specific register contained in the coprocessor 200, and a method for applying a signal to a reset terminal exposed to the outside of the coprocessor 200.

Upon receiving the reset signal at step 617, the coprocessor 200 is reset. In this case, the external RAM 230 of the coprocessor 200 stores the boot, loader, and tiny flash file system code files of the coprocessor 200. Therefore, the coprocessor 200 is reset, and its PC (Program Counter) jumps to the entrance points of the boot, loader, and tiny flash file system code areas at step 619. The coprocessor 200 can then perform its booting function at step 621, and enters a specific state in which the tiny flash file system can be operated. Thereafter, the coprocessor 200 loads a main program stored in the second flash memory 220 using the tiny flash file system in the external RAM 230 at step 623, and repeats the operation for loading the principal programs stored in the second flash memory 220. After finishing loading of the principal programs, the coprocessor 200 detects the loading completion state at step 625, automatically moves the program counter (PC) to a main program at step 627, and performs operations of the principal programs at step 629.

As apparent from the above description, the present invention can remove a NOR flash memory of a coprocessor from the system comprised in part, of a main processor and the coprocessor, resulting in the implementation of small-sized and low-priced system. Also, the present invention can store programs stored in the NOR flash memory of the coprocessor in an internal ROM of the coprocessor, an internal ROM of the main processor, and/or a first flash memory, and/or a second flash memory, and move the above programs to a memory of the coprocessor for storage in the memory of the coprocessor, such that the coprocessor can be normally operated.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus including a main device and an auxiliary device, comprising:
   the main device including:
      a main processor including a ROM (Read Only Memory) and a RAM (Random Access Memory), and controlling overall operations of the main device;
      a first flash memory for storing principal programs of the main device;
      a second flash memory for storing content data of the main device;
      a RAM provided as a work memory of the main device, and
   the auxiliary device including:
      a flash memory for storing principal programs and content data of the auxiliary device;
      an external RAM provided as a work memory of the auxiliary device; and
      a coprocessor including at least one of a ROM and a RAM which store at least one of a boot, loader, and tiny flash file system code file for booting the auxiliary device using a boot program stored in the internal ROM of the coprocessor when the coprocessor is initially powered on by the main processor, the coprocessor controlling a loader program stored in the internal ROM of the coprocessor to load principal programs stored in the flash memory of the auxiliary device by operating the tiny flash file system, and the coprocessor further controlling operations of the auxiliary device.

2. The apparatus according to claim 1, wherein:
   the first flash memory of the main device is comprised of a NOR flash memory; and
   the second flash memory of the main device and the flash memory of the auxiliary device are each comprised of a NAND flash memory.

3. The apparatus according to claim 1, wherein the tiny flash file system is comprised of a flash file system capable of reading data stored in a NAND flash memory without generating any errors.

4. An apparatus including a main device and an auxiliary device, comprising:
the main device including:
a main processor for initializing the main device when the main processor is powered on, for transmitting a tiny flash file system to the auxiliary device, and for controlling overall operations of the main device;
a plurality of flash memories including a first flash memory for storing principal programs of the main device, and a second flash memory for storing content data of the main device, wherein at least one of the first flash memory and the second flash memory store the tiny flash file system of the auxiliary device;
a RAM provided as a work memory of the main device, and
the auxiliary device including:
a flash memory for storing principal programs and content data of the auxiliary device;
a RAM provided as a work memory of the auxiliary device; and
a coprocessor including at least one of an internal ROM and RAM which store at least one of a boot and loader code file, the coprocessor performing a booting function using a boot program stored in the internal ROM of the coprocessor when the coprocessor is initially powered on by the main processor, the coprocessor further loading the tiny flash file system transmitted from the main device in the internal RAM using a loader program stored in the internal ROM of the coprocessor, the coprocessor further controlling the loader program to load principal programs stored in the flash memory of the auxiliary device in the internal RAM of the coprocessor using the loaded tiny flash file system, and the coprocessor further controlling operations of the auxiliary device.

5. The apparatus according to claim 4, wherein the first flash memory of the main device is comprised of a NOR flash memory, and the second flash memory of the main device and the flash memory of the auxiliary device are each comprised of a NAND flash memory.

6. The apparatus according to claim 5, wherein the coprocessor loads at least one of a boot, a loader, and a tiny flash file system in an external RAM when the coprocessor does not include the internal RAM such that the coprocessor is initialized.

7. An apparatus including a main device and an auxiliary device, comprising:
the main device including:
a main processor including internal ROM and RAM which store boot and loader programs of the auxiliary device, the main processor initializing the main device when the main processor is powered on, the main processor further transmitting the boot and loader programs, and a tiny flash file system to the auxiliary device, and the main processor further controlling overall operations of the main device;
flash memories including a first flash memory for storing principal programs of the main device, and a second flash memory for storing content data of the main device, wherein at least one of the first flash memory and the second flash memory store the tiny flash file system of the auxiliary device;
a RAM provided as a work memory of the main device, and
the auxiliary device including:
a flash memory for storing principal programs and content data of the auxiliary device;
an external RAM provided as a work memory of the auxiliary device; and
a coprocessor for entering a standby mode when the coprocessor is initially powered on by the main processor, the coprocessor receiving the boot and loader programs and the tiny flash file system from the main processor, the coprocessor further being reset by a reset signal generated from the main processor, the coprocessor further performing a booting function using the received boot program, the coprocessor further controlling the loader program to load principal programs stored in the flash memory of the auxiliary device using the received tiny flash file system, and the coprocessor further controlling operations of the auxiliary device.

8. The apparatus according to claim 7, wherein the first flash memory of the main device is comprised of a NOR flash memory, and the second flash memory of the main device and the flash memory of the auxiliary device are each comprised of a NAND flash memory.

9. The apparatus according to claim 8, wherein the coprocessor loads the boot and loader programs and the tiny flash file system transmitted from the main processor in the internal RAM, and performs a coprocessor initialization operation.

10. A method for initializing an auxiliary device in a system including a main device and the auxiliary device, the main device including a main processor for controlling overall operations of the main device, a first flash memory for storing principal programs of the main device and a second flash memory for storing content data of the main device, and the auxiliary device including a coprocessor for including an internal ROM for storing a boot module, loader module, and tiny flash file system, and for controlling overall operations of the auxiliary device, and a flash memory for storing principal programs and content data of the auxiliary device, the method comprising the steps of:
a) performing a booting operation using a boot program stored in the internal ROM when the coprocessor is initially powered on by the main processor;
b) loading the principal programs stored in the second flash memory using the loader program and adapting the tiny flash file system stored in the internal ROM; and
c) controlling the overall operations of the auxiliary device using the loaded principal programs.

11. The method according to claim 10, wherein the performing, loading and controlling steps are provided by the coprocessor.

12. The method according to claim 10, wherein the first flash memory of the main device is comprised of a NOR flash memory, and the second flash memory of the main device and the flash memory of the auxiliary device are each comprised of a NAND flash memory.

13. The method according to claim 10, wherein:
the boot module is comprised of a software module for initializing operations of the coprocessor, and for shifting to a main software routine,
the loader module is comprised of a software module for loading data from the flash memory to a specific area of at least one of an internal RAM and an external RAM using the tiny flash file system, or for loading data to a specific area of at least one of the internal RAM or the external RAM while communicating with the main processor; and the tiny flash file system is comprised of a minimum software module capable of reading data from the flash memory without generating any errors.

14. A method for initializing an auxiliary device in a system including a main device and the auxiliary device, the main device including a main processor for including an internal ROM and for controlling overall operations of the main device, a first flash memory for storing principal programs of the main device, a second flash memory for storing content data of the main device, and a tiny flash file system stored in the internal ROM, the first flash memory, or the second flash memory, and the auxiliary device including a coprocessor for including an internal ROM for storing a boot module, loader module, and tiny flash file system and for controlling overall operations of the auxiliary device, and a flash memory for storing principal programs and content data of the auxiliary device, the method comprising the steps of:

a) performing a booting operation using a boot program stored in the internal ROM of the coprocessor when the coprocessor is initially powered on by the main processor;

b) loading a tiny flash file system stored in the internal ROM, the first flash memory, or the second flash memory of the main processor using a loader program stored in the internal ROM of the coprocessor;

c) loading the principal programs stored in the flash memory of the auxiliary device using the loading program and the loaded tiny flash file system; and d) controlling operations of the auxiliary device using the loaded principal programs.

15. The method according to claim 14, wherein the performing, loading and controlling steps are provided by the coprocessor.

16. The method according to claim 14, wherein the first flash memory of the main device is comprised of a NOR flash memory, and the second flash memory of the main device and the flash memory of the auxiliary device are each comprised of a NAND flash memory.

17. The method according to claim 14, wherein:

the boot module is comprised of a software module for initializing operations of the coprocessor, and for shifting to a main software routine;

the loader module is comprised of a software module for initializing at least one module after being booted, for accessing the flash memory using the tiny flash file system while communicating with the main processor, and for moving the remaining main software code parts to a specific memory area where the coprocessor can be operated; and the tiny flash file system is comprised of a minimum software module capable of reading data from the flash memory without generating any errors.

18. A method for initializing an auxiliary device in a system including a main device and an auxiliary device, the main device including a main processor for including an internal ROM and for controlling overall operations of the main device, a first flash memory for storing principal programs of the main device, and a second flash memory for storing content data of the main device, in which a boot module, loader module, and tiny flash file system code files of the auxiliary device are stored in the internal ROM, the first flash memory, or the second flash memory, and the auxiliary device including a coprocessor for controlling overall operations of the auxiliary device, and a flash memory for storing principal programs and content data of the auxiliary device, the method comprising the steps of:

a) entering a standby mode using the coprocessor when the coprocessor is initially powered on by the main processor;

b) transmitting the auxiliary device's boot module, loader module, and tiny flash file system stored in the internal ROM, the first flash memory, or the second flash memory to the coprocessor using the main processor, and storing the transmitted data in the coprocessor;

c) generating a reset signal when the main processor finishes transmitting the boot module, loader module, and tiny flash file system of the auxiliary device, and performing a booting function by the coprocessor using the a received boot program upon receipt of the reset signal;

d) loading the principal programs stored in the flash memory of the auxiliary device using the a loader program and the received tiny flash file system, using the coprocessor; and e) controlling the operations of the auxiliary device using the loaded principal programs, using the coprocessor.

19. The method according to claim 18, wherein the first flash memory of the main device is comprised of a NOR flash memory, and the second flash memory of the main device and the flash memory of the auxiliary device are each comprised of a NAND flash memory.

20. The method according to claim 19, wherein:

the boot module is comprised of a software module for initializing operations of the coprocessor, and for shifting to a main software routine; and the tiny flash file system is comprised of a minimum software module capable of reading data from the flash memory without generating any errors.

* * * * *